(12) United States Patent
Yang et al.

(10) Patent No.: US 9,511,339 B2
(45) Date of Patent: Dec. 6, 2016

(54) SERIES COUPLED FLUIDIZED BED REACTOR UNITS INCLUDING CYCLONIC PLENUM ASSEMBLIES AND RELATED METHODS OF HYDROFLUORINATION

(71) Applicant: Honeywell International Inc., Morristown, NJ (US)

(72) Inventors: Terris Yang, Kenmore, NY (US); Robert Johnson, Lancaster, NY (US); Hsueh Sung Harry Tung, Getzville, NY (US)

(73) Assignee: Honeywell International Inc., Morris Plains, NJ (US)

( * ) Notice: Subject to any disclaimer, the term of this patent is extended or adjusted under 35 U.S.C. 154(b) by 571 days.

(21) Appl. No.: 14/014,969

(22) Filed: Aug. 30, 2013

(65) Prior Publication Data

US 2015/0064090 A1 Mar. 5, 2015

(51) Int. Cl.
*C01B 9/08* (2006.01)
*B01J 8/26* (2006.01)
*C01G 43/06* (2006.01)
*B01J 8/44* (2006.01)

(52) U.S. Cl.
CPC .. *B01J 8/26* (2013.01); *B01J 8/44* (2013.01); *C01G 43/06* (2013.01)

(58) Field of Classification Search
CPC ............. C01G 43/06; C01B 7/00; C01B 9/08; C01B 9/00
USPC .................................. 423/259, 462, 489, 491
See application file for complete search history.

(56) References Cited

U.S. PATENT DOCUMENTS

| 3,179,491 A | 4/1965 | Ukaji et al. |
| 4,053,559 A | 10/1977 | Hart et al. |
| 5,628,048 A | 5/1997 | Schaal et al. |
| 5,753,191 A | 5/1998 | Yamamoto et al. |
| 7,824,640 B1 | 11/2010 | Lahoda |
| 2006/0057042 A1 | 3/2006 | Amamoto et al. |
| 2007/0207068 A1 | 9/2007 | Lange et al. |
| 2011/0189054 A1 | 8/2011 | Sheng |

FOREIGN PATENT DOCUMENTS

WO 2008074632 A1 6/2008

OTHER PUBLICATIONS

PCT ISR & Written Opinion issued in PCT/US2014/051431 dated Dec. 22, 2014.
Wang, Weiwen et al. "Structure and Performance of the Circumfluent Cyclone," Powder Technology, vol. 200, Issue 3, Jun. 28, 2010, pp. 158-163.

*Primary Examiner* — Edward Johnson
(74) *Attorney, Agent, or Firm* — Ingrassia Fisher & Lorenz PC (57) ABSTRACT

Embodiments of a series-coupled fluidized bed reactor unit are provided. In one embodiment, the reactor unit includes primary and secondary reactors. The primary reactor includes a reaction vessel, a gas distributor fluidly coupled to the reaction vessel, and a cyclonic plenum assembly. The cyclonic plenum assembly includes a plenum assembly housing, which is fluidly coupled to the gas distributor and which has an annular sidewall; and a gas/solids inlet pipe, which fluidly couples a partially-reacted gas outlet of the secondary reactor to the plenum assembly housing. The gas/solids inlet pipe is tangentially positioned with respect to the annular sidewall of the plenum assembly housing to induce vortex flow within the plenum assembly housing of the partially-reacted gas received from the secondary fluidized bed reactor through the gas/solids inlet pipe to promote the cyclonic separation of entrained solids from the partially-reacted gas prior to entry into the gas distributor.

20 Claims, 3 Drawing Sheets

SERIES COUPLED FLUIDIZED BED REACTOR UNITS INCLUDING CYCLONIC PLENUM ASSEMBLIES AND RELATED METHODS OF HYDROFLUORINATION

TECHNICAL FIELD

The present invention relates generally to fluidized bed processing and, more particularly, to embodiments of a series-coupled fluidized bed reactor unit including a cyclonic plenum assembly that minimizes clogging of the primary reactor's gas distributor, as well to hydrofluorination methods carried-out utilizing such a series-coupled fluidized bed reactor unit.

BACKGROUND

Fuel for nuclear power plants is produced by uranium enrichment processes requiring uranium hexafluoride ($UF_6$) as a feed or input. $UF_6$ is commonly produced by the fluorination of uranium tetrafluoride ($UF_4$), which is, in turn, commonly produced utilizing a multi-stage hydrofluorination process. During a typical multi-stage hydrofluorination process, uranium dioxide ($UO_2$) is introduced as a solid feed into a first fluidized bed hydrofluorination reactor (referred to herein as the "primary hydrofluorinator") and contacted with partially-reacted hydrogen fluoride (HF) gas to produce partially-reacted $UF_4$. The partially-reacted $UF_4$ is then supplied to a second fluidized bed hydrofluorination reactor (referred to herein as the "secondary hydrofluorinator") within which the $UF_4$ is contacted with a fresh HF gas feed. This second stage hydrofluorination process results in the production of fully-reacted $UF_4$, which is then withdrawn from the secondary hydrofluorinator through a lower solids outlet. The partially-reacted gas produced pursuant to the second stage hydrofluorination reaction is withdrawn from the secondary hydrofluorinator through an upper manifold and recycled back to a single-chamber plenum disposed beneath the reaction chamber of the primary hydrofluorinator. The partially-reacted gas is supplied to the plenum via a gas/solids inlet pipe, which penetrates through the plenum's annular sidewall along an axis projecting through the plenum's center. The partially-reacted gas reorients within the plenum before flowing into a gas distributor (e.g., a perforated plate or sintered grate), which injects the gas into the primary hydrofluorinator's reaction chamber for further reaction with newly-supplied $UO_2$.

Particulate solids inevitably become entrained in the partially-reacted gas withdrawn from the secondary hydrofluorinator and supplied to the single-chamber plenum of the primary hydrofluorinator. The larger entrained particles, which may have diameters approaching those of the gas flow openings provided in the gas distributor, can potentially clog the distributor's gas flow openings as an aggregate mass. Clogging of the distributor's gas flow openings not only impedes gas flow through the distributor, but also results in the maldistrubtion of hydrogen fluoride gas within the primary reaction chamber. The maldistrubtion of HF gas reduces the overall efficacy of the hydrofluorination reaction and produces dead zones along the upper face of the gas distributor, which increase the likelihood of areas of extreme localized heating (commonly referred to as "hot spots") developing within the reaction chamber. Gas distributor clogging may ultimately necessitate shutdown of the hydrofluorination unit to allow cleaning of the gas distributor, which adds undesired expense and delay to the hydrofluorination process. While one or more freestanding particulate filters may be disposed upstream of the primary hydrofluorinator to reduce the quantity of entrained solids reaching the gas distributor, such filters require routine maintenance to replace or clean of saturated filter elements and thus also necessitate periodic shutdown of the hydrofluorination unit.

It would thus be desirable to provide embodiments of a series-coupled fluidized bed reactor unit, such as a multi-stage fluidized bed hydrofluorination unit, wherein clogging of a gas distributor included within the unit is minimized or eliminated by removal of entrained solids from a partially-reacted gas stream supplied to the gas distributor. Ideally, embodiments of such a series-coupled fluidized bed reactor unit would enable the continual and uninterrupted removal of larger entrained solids from the partially-reacted gas stream with minimal maintenance requirements. It would also be desirable to provide embodiments of a hydrofluorination process carried-out utilizing such a series-coupled fluidized bed reactor unit. Other desirable features and characteristics of the present invention will become apparent from the subsequent Detailed Description and the appended Claims, taken in conjunction with the accompanying Drawings and the foregoing Background.

BRIEF SUMMARY

Embodiments of a series-coupled fluidized bed reactor unit are provided. In one embodiment, the series-coupled fluidized bed reactor unit includes a primary fluidized bed reactor and a secondary fluidized bed reactor having a partially-reacted gas outlet. The primary fluidized bed reactor includes a reaction vessel, a gas distributor fluidly coupled to the reaction vessel, and a cyclonic plenum assembly. The cyclonic plenum assembly includes a plenum assembly housing, which is fluidly coupled to the gas distributor and which has an annular sidewall; and a gas/solids inlet pipe, which fluidly couples the partially-reacted gas outlet to the plenum assembly housing. The gas/solids inlet pipe is tangentially positioned with respect to the annular sidewall of the plenum assembly housing to induce vortex flow within the plenum assembly housing of the partially-reacted gas received from the secondary fluidized bed reactor through the gas/solids inlet pipe to promote the cyclonic separation of entrained solids from the partially-reacted gas prior to entry into the gas distributor.

Embodiments of a fluidized bed hydrofluorination reactor unit are further provided for contacting a uranium dioxide feed with hydrogen fluoride gas to produce uranium hexafluoride. In one embodiment, the fluidized bed hydrofluorination reactor unit includes primary and secondary fluidized bed hydrofluorination reactor. The primary fluidized bed hydrofluorination reactor includes: (i) a reaction vessel having a solids inlet for receiving the uranium dioxide feed and having a partially-reacted solids outlet for discharging partially-reacted uranium tetrafluoride; (ii) a cyclonic plenum assembly having a partially-reacted gas inlet for receiving partially-reacted hydrogen fluoride gas; and (iii) a gas distributor fluidly coupling the cyclonic plenum assembly to the reaction vessel. The secondary fluidized bed hydrofluorination reactor has a partially-reacted solids inlet coupled to the partially-reacted solids outlet for receiving the partially-reacted uranium tetrafluoride from the primary fluidized bed hydrofluorination reactor, a gas inlet for receiving the hydrogen fluoride gas, and a partially-reacted gas outlet fluidly coupled to the partially-reacted gas inlet for supplying partially-reacted hydrogen fluoride gas to the primary fluidized bed hydrofluorination reactor.

Embodiments of a hydrofluorination process are still further provided. In one embodiment, the hydrofluorination process is carried-out utilizing a fluidized bed hydrofluorination reactor unit including a primary fluidized bed hydrofluorination reactor fluidly interconnected with a secondary fluidized bed hydrofluorination reactor. The primary fluidized bed hydrofluorination reactor includes a cyclonic plenum assembly. The hydrofluorination process includes the step of directing a partially-reacted gas stream withdrawn from the secondary fluidized bed hydrofluorination into the cyclonic plenum assembly through a gas/solids inlet pipe tangentially disposed with respect to an annular sidewall of the cyclonic plenum assembly to induce vortex flow within the cyclonic plenum assembly and promote the cyclonic separation of entrained solids from the partially-reacted gas stream. The hydrofluorination process further includes the step of removing the entrained solids separated from the partially-reacted gas stream through a solids drain pipe included within the cyclonic plenum assembly.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As utilized herein, the term "pipe" encompasses all types of flow conduits, as well as assemblies of flow conduits joined in fluid communication.

Although described below in conjunction with a particular type of series-coupled fluidized bed reactor unit, namely, a multi-stage fluidized bed hydrofluorination reactor unit, embodiments of the reactor unit can assume any form wherein at least two reaction chambers are coupled in series, as considered with respect to the flow of a gaseous reactant; and wherein partially-reacted gas from a second reaction chamber, which is entrained with solid particulate matter, is directed into a gas distributor for injection into a first reaction chamber. Embodiments of the series-coupled fluidized bed reactor unit may be utilized to carry-out fluidized bed reactions other than hydrofluorination reactions including, but not limited to, reduction reactions, oxidation reactions, pyrolysis, and chlorination reactions. This notwithstanding, embodiments of the series-coupled fluidized bed reactor unit described below are particularly well-suited for carrying-out dual stage hydrofluorination reactions wherein clogging of gas flow openings in a gas distributor may be especially problematic due, at least in part, to the highly reactive nature of fluorine; the relatively small disparity that often exists between the diameters of the gas flow openings provided in the gas distributor and the average particle size of the larger solids ($UO_2$ and $UF_4$) entrained within the partially-reacted HF gas; the tendency of particulate matter to aggregate into larger, rock-like masses; and the tremendous amounts of heat generated by the hydrofluorination reaction, which tends to localize as hot spots in dead zones created by clogging of the gas distributor. Thus, in preferred embodiments, and by way of non-limiting example only, the series-coupled fluidized bed reactor unit is implemented as a multi-stage fluidized bed hydrofluorination reactor unit utilized to contact $UO_2$ with HF gas and thereby produce solid $UF_4$.

Figure 1:
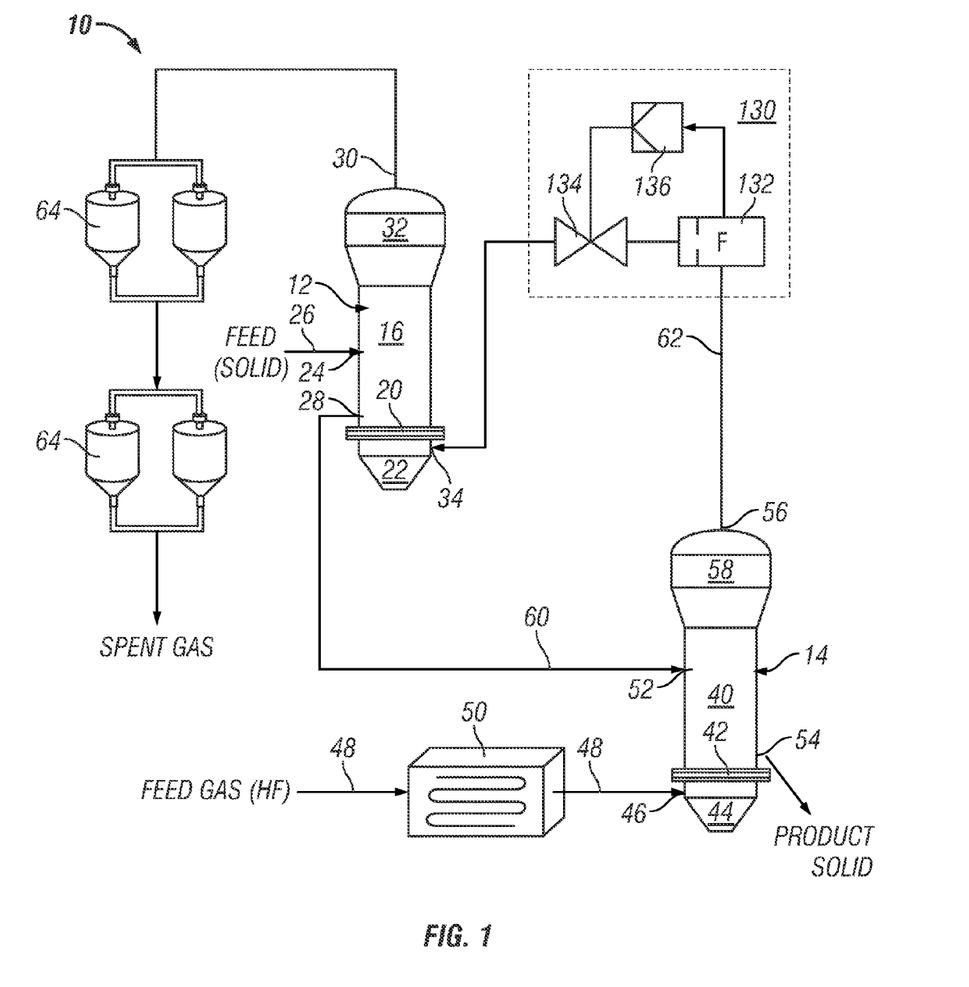
FIG. 1 is a simplified flow schematic of a series-coupled fluidized bed reactor unit, and specifically a multi-stage fluidized bed hydrofluorination unit, including first and second fluidized bed reactors and illustrated in accordance with an exemplary embodiment of the present invention.

FIG. 1 is a simplified flow schematic of a series-coupled fluidized bed reactor unit, and specifically a multi-stage fluidized bed hydrofluorination reactor unit 10, illustrated in accordance with an exemplary embodiment of the present invention. Reactor unit 10 includes a first fluidized bed hydrofluorination reactor 12 fluidly interconnected with a second fluidized bed hydrofluorination reactor 14. For ease of reference, first and second fluidized bed hydrofluorination reactors 12 and 14 will be referred to hereafter as "primary and secondary hydrofluorinators 12 and 14," respectively, in view of the order in which the solid feed (e.g., $UO_2$) is processed, as described below. Primary hydrofluourinator 12 includes a vertically-oriented reaction vessel 16 having a reaction chamber 18 (identified in FIG. 2); a cyclonic plenum assembly 22; and a gas distributor 20, which fluidly couples cyclonic plenum assembly 22 to the reaction chamber of vessel 16. A solids inlet 24 is provided through the annular sidewall of reaction vessel 16 for reception of a solid feed material from a feed source (generically represented in FIG. 1 by arrow 26), and a solids outlet 28 is likewise provided through the annular sidewall of reaction vessel 16 for the withdrawal of a partially-reacted solid from reaction vessel 16. A spent gas outlet 30 is further provided through an upper manifold 32 enclosing the upper end of reaction vessel 16 for the withdrawal of spent gas. Lastly, a partially-reacted gas inlet 34 is provided through the annular sidewall of cyclonic plenum assembly 22 for the reception of partially-reacted gas recovered from secondary hydrofluorinator 14.

In the illustrated example wherein reactor unit 10 assumes the form of a multi-stage fluidized bed hydrofluorination reactor unit, the solid feed material supplied to reaction vessel 16 contains, and preferably consists substantially entirely of, a $UO_2$ feedstock. The $UO_2$ feedstock may be produced by a reduction reaction wherein a uniformly-sized uranium oxide mixture (commonly referred to as "yellowcake") is reacted with hydrogen at high temperatures. Also, in the illustrated example wherein reactor unit 10 assumes the form of a multi-stage fluidized bed hydrofluorination reactor unit, the partially-reacted solid withdrawn from primary hydrofluorinator 12 through solids outlet 28 contains, and preferably consists substantially entirely of, partially-reacted $UF_4$ (commonly referred to as "green salt"); and the partially-reacted gas injected into primary hydrofluorinator 12 through partially-reacted gas inlet 34 contains, and preferably consists substantially entirely of, partially-reacted HF gas, along with other byproducts produced during the hydrofluorination reaction (e.g., water or steam) and possibly inert gases from various purges.

As does primary hydrofluorinator 12, secondary hydrofluorinator 14 includes a vertically-oriented reaction vessel 40 having a reaction chamber therein (hidden from view in FIG. 1 by the shell of vessel 40), a lower plenum assembly 42, and a gas distributor 44. Gas distributor 44 fluidly couples plenum assembly 42 to the reaction chamber of reaction vessel 40 and may assume the form of a perforated plate or a sintered grate. A gas inlet 46 is provided through the annular sidewall of plenum assembly 42 for reception of a fresh reactant gas feed (generically represented in FIG. 1 by arrow 48). In the illustrated example, the gas feed contains, and preferably consists substantially entirely of, HF gas. As shown in FIG. 1, the HF gas feed stream may be preheated by a heater 50 prior to injection into plenum assembly 42 to promote the hydrofluorination reaction within reaction vessel 40. In addition to gas inlet 46, secondary hydrofluorinator 14 includes the following additional ports: (i) a partially-reacted solids inlet 52 provided through the annular sidewall of reaction vessel 40, (ii) a fully-reacted solids or product outlet 54 provided through the annular sidewall of reaction vessel 40 below solids inlet 52, and (iii) a partially-reacted gas outlet 56 provided through an upper manifold 58 enclosing the upper end of reaction vessel 40.

As schematically illustrated in FIG. 1 at 60, partially-reacted solids outlet 28 of primary hydrofluorinator 12 is coupled to partially-reacted solids inlet 52 of secondary hydrofluorinator 14; and, as schematically illustrated in FIG. 1 at 62, partially-reacted gas outlet 56 of secondary hydrofluorinator 14 is fluidly coupled to partially-reacted gas inlet 34 of primary hydrofluorinator 12. During reactor unit operation, the solid $UO_2$ feed is contacted with recycled HF gas within the reaction chamber of primary hydrofluorinator 12 to produce partially-reacted $UF_4$ and spent gas. As the spent gas collects within upper manifold 32, the spent gas is withdrawn through spent gas outlet 30 and directed through a series of parallel filters 64 before ultimately being removed from reactor unit 10. Partially-reacted $UF_4$ is withdrawn from primary hydrofluorinator 12 through partially-reacted solids outlet 28 and directed into the reaction chamber of secondary hydrofluorinator 14 for further hydrofluorination. As indicated in FIG. 1, primary hydrofluorinator 12 may be positioned at a higher elevation than is secondary hydrofluorinator 14 to promote gravity flow of the partially-reacted $UF_4$ from partially-reacted solids outlet 28 to partially-reacted solids inlet 52. Within the reaction chamber of secondary hydrofluorinator 14, the partially-reacted $UF_4$ undergoes a secondary hydrofluorination reaction to yield the desired product, fully-reacted $UF_4$, which is continually withdrawn from secondary hydrofluorinator 14 through solids outlet 54. After withdrawal from secondary hydrofluorinator 14, the fully-reacted $UF_4$ is subject to further processing (e.g., a single fluidized bed fluorination process) to yield uranium hexafluoride ($UF_6$), which may then be distilled or otherwise purified to complete the uranium conversion process.

As previously stated, partially-reacted gas outlet 56 of secondary hydrofluorinator 14 is fluidly coupled to partially-reacted gas inlet 34 of primary hydrofluorinator 12. During operation of reactor unit 10, partially-reacted gas collects within upper manifold 58 of secondary hydrofluorinator 14, exits hydrofluorinator 14 through partially-reacted gas outlet 56, flows through conduit line 62, and enters cyclonic plenum assembly 22. As described in the foregoing section entitled "BACKGROUND," particulate solids are unavoidably entrained in the partially-reacted gas stream withdrawn from secondary hydrofluorinator 14 and supplied to cyclonic plenum assembly 22 of primary hydrofluorinator 14. If allowed to travel into gas distributor 20, these entrained solids can potentially clog or block the distributor's gas flow openings and thereby cause various operational problems, including the maldistrubtion of hydrogen fluoride gas within the reaction chamber of primary hydrofluorinator 14. While one or more freestanding particulate filters can be positioned along conduit line 62 between partially-reacted gas outlet 56 of secondary hydrofluorinator 14 and partially-reacted gas inlet 34 of primary hydrofluorinator 12, such particulate filters require periodic servicing to, for example, replace or clean saturated filter elements. To overcome these limitations, cyclonic plenum assembly 22 provides a unique means for continually separating larger-sized entrained particles, which are chiefly responsible for the clogging of the distributor gas flow openings, from the partially-reacted gas flow immediately prior to entry into gas distributor 20. Advantageously, cyclonic plenum assembly 22 provides this separation or cleaning function in a continuous and low maintenance manner and does not require the usage of filter elements, which can become saturated over time and require replacement or cleaning.

Figure 2:
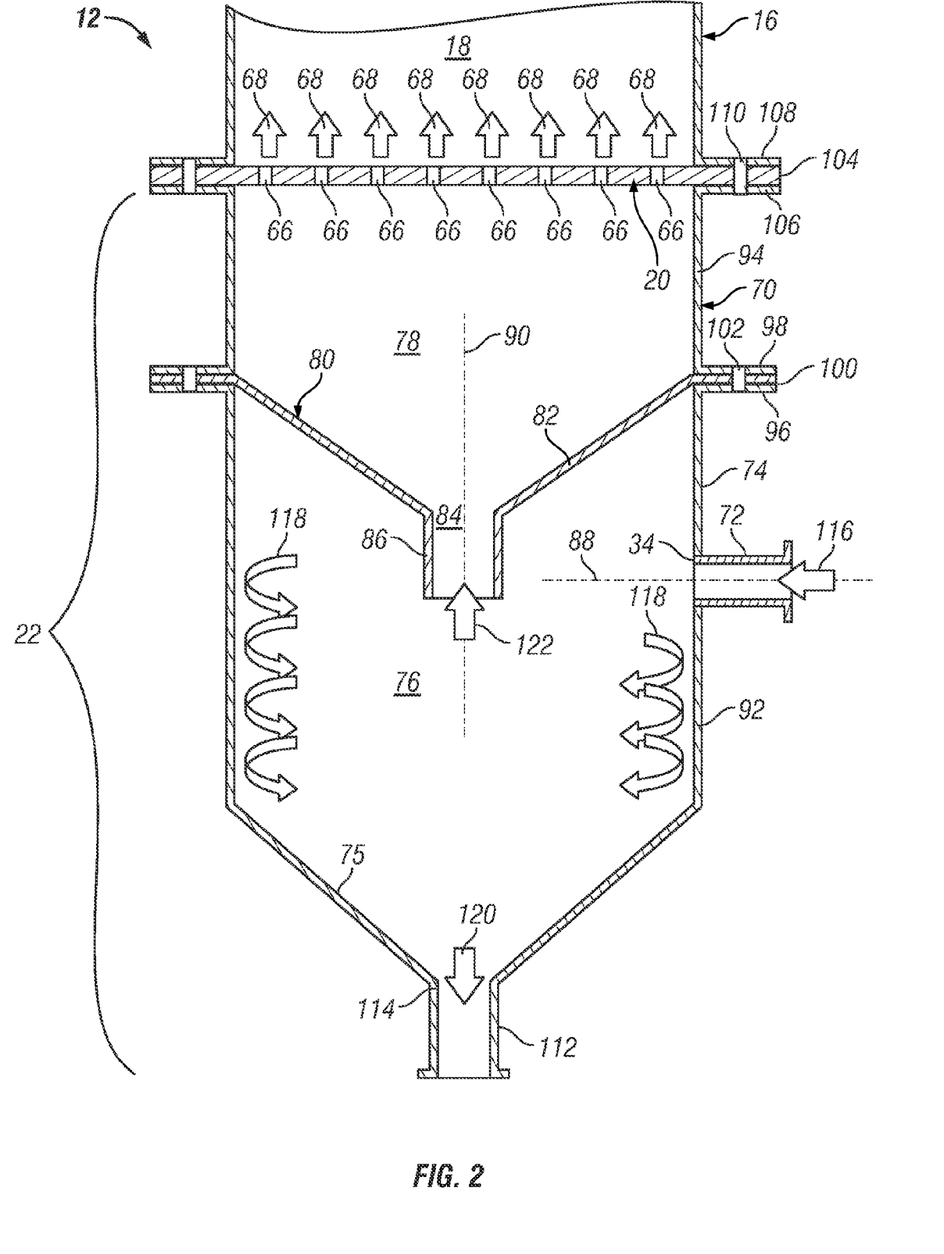
FIG. 2 is a cross-sectional view of a lower portion of the first fluidized bed reactor shown in FIG. 1 illustrating an exemplary cyclonic plenum assembly, a gas distributor, and a lower portion of the reaction vessel.

FIG. 2 is a cross-sectional view of a lower portion of primary hydrofluorinator 12 illustrating gas distributor 20 and cyclonic plenum assembly 22 in greater detail. In this view, it can be seen that gas distributor 20 assumes the form of a substantially flat, perforated plate having a plurality of gas flow openings 66 formed therethrough. This example notwithstanding, gas distributor 20 may assume the form of any structural element or assemblage of structural elements, such as a sintered grate, suitable for injecting HF gas (or another gaseous reactant) into reaction chamber 18, preferably as a plurality of high velocity jets as indicated in FIG. 2 by arrows 68. Gas distributor 20 is mounted between the lower end of reaction vessel 16 and the upper end of cyclonic plenum assembly 22 and fluidly couples cyclonic plenum assembly 22 to reaction chamber 18. Cyclonic plenum assembly 22, which is positioned below gas distributor 20, includes a plenum assembly housing 70 and a gas/solids inlet pipe 72. In the illustrate example, plenum assembly housing 70 has a substantially cylindrical geometry and includes an annular sidewall 74 and a generally conical bottom wall 75 joined to the lower circumferential edge of annular sidewall 74. Gas/solids inlet pipe 72 supplies partially-reacted gas into plenum assembly housing 70 through partially-reacted gas inlet 34, which is formed through annular sidewall 74. Gas/solids inlet pipe 72 may penetrate partially or fully through annular sidewall 74 and is tangentially positioned with respect to sidewall 74 to induce vortex flow of the partially-reacted gas within plenum assembly housing 70, as described more fully below in conjunction with FIG. 3.

Plenum assembly housing 70 includes two chambers, namely, a cyclonic separation chamber 76 into which gas/solids inlet pipe 72 feeds, and a clean gas chamber 78 fluidly coupled between cyclonic separation chamber 76 and gas distributor 20. A partitioning member 80 is disposed between, and thus partitions or fluidly separates, cyclonic separation chamber 76 and clean gas chamber 78. In the illustrated example, partitioning member 80 includes a conical plate 82, which is mounted within plenum assembly housing 70 and which increases in diameter with increasing proximity to gas distributor 20. A central opening 84 is provide through conical plate 82 and fluidly couples cyclonic separation chamber 76 to clean gas chamber 78. A clean gas inlet pipe 86 is fluidly coupled to central opening 84 and extends downward from conical plate 82 toward a central portion of cyclonic separation chamber 76. As shown in FIG. 2, clean gas inlet pipe 86 preferably extends beyond a horizontal plane drawn through gas/solids inlet pipe 72 and, more preferably, through the centerline of gas/solids inlet pipe 72 (represented in FIG. 2 by dashed line 88). Stated differently, the positioning of gas/solids inlet pipe 72 is preferably such that a horizontal plane drawn through pipe 72 extends through an upper portion of cyclonic separation chamber 76 to transect clean gas inlet pipe 86. The positioning of gas/solids inlet pipe 72 is also preferably such that a horizontal plane drawn through the centerline of pipe 72 is substantially perpendicular to the longitudinal or vertical axis of primary hydrofluorinator 12 (represented in FIG. 2 by dashed line 90). Central opening 84 and clean gas inlet pipe 86 are preferably substantially co-axial with the longitudinal axis 90 of hydrofluorinator 12.

The number of components included within cyclonic plenum assembly 22, the relative disposition of the assembly components, and the manner in which the assembly components are joined to produce cyclonic plenum assembly 22 will inevitably vary amongst different embodiments. In the illustrated example, cyclonic plenum assembly 22 is assembled from a number of discrete components that are fixedly joined together by way of a flanged coupling. More specifically, plenum assembly housing 70 includes two housing members, namely, a lower housing member 92 and an upper housing member 94. A first circumferential flange 96 is provided around the upper circumferential edge of lower housing member 92, and a second circumferential flange 98 is provided around the lower circumferential edge of upper housing member 94. As utilized herein, the term "circumferential flange" encompasses a continuous annular structure or wall, as well as a plurality of radially-extending tabs. A third circumferential flange 100 is further provided around the outer periphery of conical plate 82 of partitioning member 80. When cyclonic plenum assembly 22 is assembled, flange 100 of partitioning member 80 is captured or retained between flange 96 of lower housing member 92 and flange 98 of upper housing member 94. Each flange 96, 98, and 100 includes a plurality of circumferentially-spaced openings therethrough, which align when cyclonic plenum assembly 22 is assembled to define a plurality of fastener openings 102 through which a plurality of bolts or fasteners may be disposed (not shown). Gasketing may also be provided (not shown in FIG. 2 for clarity) to achieve a leak-tight seal between the mating components of cyclonic plenum assembly 22.

A flanged coupling is also advantageously utilized to join cyclonic plenum assembly 22, gas distributor 20, and the lower end of reaction vessel 16. In particular, as shown in FIG. 2, gas distributor 20 may be further provided with a circumferential flange 104, which extends radially outward from the main body of distributor 20 through which gas flow openings 66 are provided. As indicated in FIG. 2, circumferential flange 104 may be captured between a first mating flange 106, which extends radially outward from the upper end of cyclonic plenum assembly 22 and, specifically, from the upper circumferential edge of upper housing member 94; and a second mating flange 108, which extends radially outward from the lower circumferential edge of reaction vessel 16. As was the case previously, a plurality of fastener openings 110 may be provided through flanges 104, 106, and 108 to receive a plurality of bolts or other such fasteners (not shown) and thereby fixedly join reaction vessel 16, gas distributor 20, and cyclonic plenum assembly 22 together in structurally robust manner to support the weight of the fluidized bed within reaction vessel 16 and to prevent leakage through thermal cycling of vessel 16 (again, non-illustrated gasketing may be provided).

With continued reference to the exemplary embodiment illustrated in FIG. 2, cyclonic separation chamber 76 is generally defined or bounded by the lower surface of partitioning member 80 and the inner circumferential surface of lower housing member 92 of plenum assembly housing 70; while clean gas chamber 78 is generally defined by the upper surface of partitioning member 80, the inner circumferential surface of upper housing member 94 of plenum assembly housing 70, and the lower face of gas distributor 20. As noted above, cyclonic separation chamber 76 is fluidly coupled to clean gas chamber 78 via a central opening 84 provided through conical plate 82 of portioning member 80. Cyclonic separation chamber 76 is further fluidly coupled to a solids drain pipe 112 (also referred to as a "downcomer pipe") by way of a lower solids outlet 114, which is formed through a central portion of conical bottom wall 75 of plenum assembly housing 70. The upper end section of solids drain pipe 112 is also mechanically coupled (e.g., welded or threadably attached) to the inner circumferential surface of conical bottom wall 75 defining solids outlet 114. In the illustrated example, solids drain pipe 112 is substantially co-axial with central opening 84 and clean gas inlet pipe 86. It should be noted that the design of conical plate 82, in addition to supporting the nozzle/clean gas inlet pipe 86, also provides that any solids which might fall down from the distributor plate 20 above during times of shut-down or process interruption, will not remain in the chamber 78, but will fall downward toward the plenum where they can be easily discharged.

Figure 3:
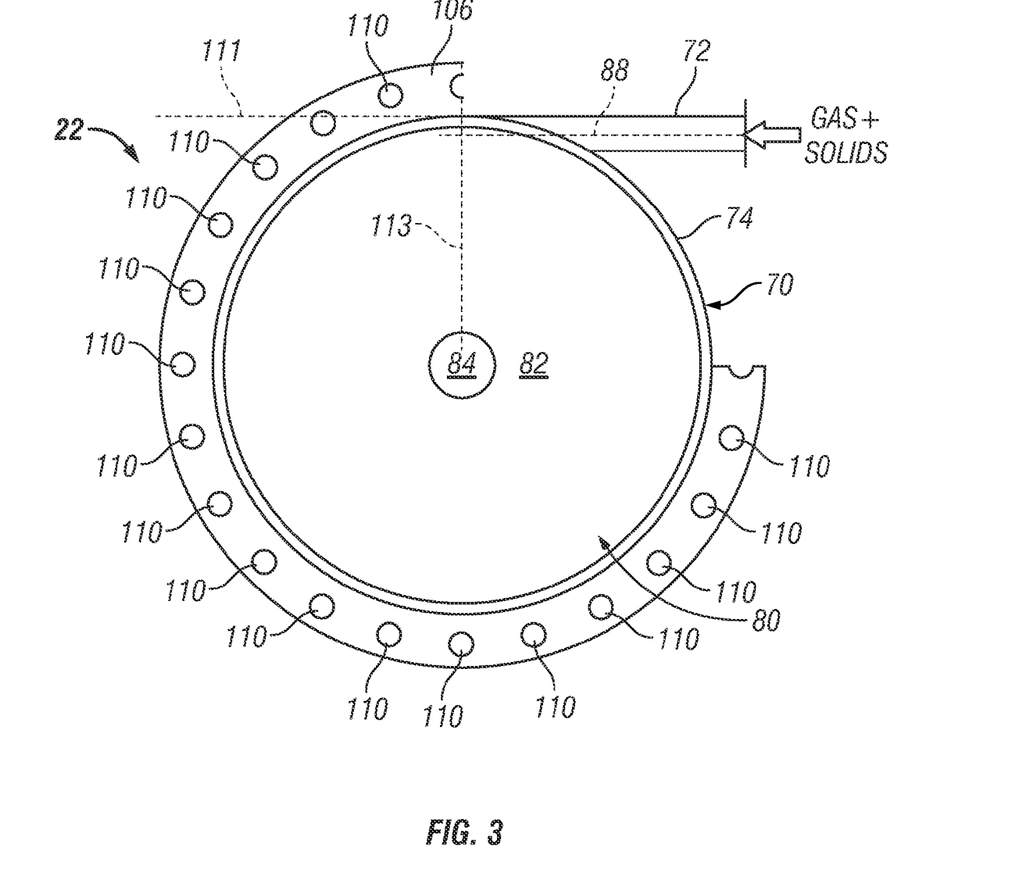
FIG. 3 is a top-down cutaway view of the exemplary cyclonic plenum assembly shown in FIG. 2 and illustrating one manner in which a gas/solids inlet pipe may be tangentially positioned with respect to an annular sidewall of the plenum assembly housing.

FIG. 3 is a top-down view of cyclonic plenum assembly 22 illustrating one manner in which gas/solids inlet pipe 72 may be tangentially positioned with respect to annular sidewall 74 of plenum assembly housing 70. Flange 106 is shown in partial cutaway in FIG. 3 to better illustrate the tangential disposition of gas/solids inlet pipe 72 with respect to plenum assembly housing 70; and flanges 96, 98, and 100 are hidden from view in FIG. 3 by flange 106. As appearing herein, the term "tangentially positioned," "tangentially disposed," and like terms are utilized to indicate that the longitudinal axis, centerline, or extension of gas/solids inlet pipe 72 is substantially parallel to a tangent line drawn to the inner circumferential surface of an annular sidewall of a plenum assembly housing; and, further, that the centerline of inlet pipe resides closer to the tangent line than to the centerline line or longitudinal axis of cyclonic plenum assembly 22 (represented in FIG. 2 by dashed line 90). With reference to FIG. 3, in particular, it can be seen that centerline 88 of gas/solids inlet pipe 72 extends in a direction substantially parallel to and resides substantially adjacent tangent line 111 drawn to annular sidewall 74 of plenum assembly housing 70. In preferred embodiments, a terminal segment of gas/solids inlet pipe 72 generally extends along a tangent line drawn to the inner circumferential surface of annular sidewall 74 of plenum assembly housing 70. As further indicated in FIG. 3, the centerline 88 of gas/solids inlet pipe 72 may be substantially perpendicular to an intersecting radius 113 of plenum assembly housing 70 and may be spaced from the center of cyclonic plenum assembly 22 by a distance substantially equivalent to the radius of plenum assembly housing 70, as measured along intersecting radius 113. As appearing herein, the term "substantially equivalent to" denotes a quantitative difference of less than 10%.

Due to the tangential disposition of gas/solids inlet pipe 72, partially-reacted gas introduced into cyclonic separation chamber 76 through gas/solids inlet pipe 72 (represented in FIG. 2 by arrow 116) will tend to swirl or flow around the interior of the chamber 76 in a vortices-like manner (represented in FIG. 2 by arrows 118). The vortices flow of the partially-reacted gas promotes the cyclonic separation of larger and heavier entrained solids from the partially-reacted gas by centrifugal forces. The larger entrained solids are thus gradually forced to the bottom of cyclonic separation camber 76, funneled by conical bottom wall 75 into lower solids outlet 114, and are ultimately removed from chamber 76 through solids drain pipe 112, as indicated in FIG. 2 by arrow 120. The partially-reacted gas, now substantially free of larger entrained solids, flows toward a central portion of separation chamber 76 and travels upward into clean gas inlet pipe 86, as indicated in FIG. 2 by arrow 122. Clean gas inlet pipe 86 directs the clean gas through central opening 84 and into clean gas chamber 78. The clean gas flow then reorients within clean gas chamber 78 before flowing through gas flow openings 66 of gas distributor 20 and into reaction chamber 18 of primary hydrofluorinator 12 for hydrofluorination with the solid feedstock (e.g., $UO_2$), as previously described. The dimensions and geometries gas/solids inlet pipe 72 and cyclonic separation chamber 76 are preferably determined as a function of entrained particle size and density, gas flow velocities, throughput requirements, and other such operational parameters to optimize the centrifugal or cyclonic separation of entrained particles from the partially-reacted gas flow.

By removing the larger entrained solids from the partially-reacted gas flow immediately prior to entry into gas distributor 20, cyclonic separation chamber 76 effectively prevents or minimizes clogging of gas flow openings 66 and thus mitigates the various problems that can arise therefrom. While the cyclonic separation action employed by cyclonic separation chamber 76 is less effective at removing smaller, lighter-weight particles, such particles are typically capable of passing through gas flow openings 66 of distributor 20 with relative ease and consequently pose little risk of gas distributor clogging. Advantageously, cyclonic plenum assembly 22 directs entrained particles removed from the partially-reacted gas flow downward through lower solids outlet 114 and into solids drain pipe 112 for continual removal of particulate matter from the system without the usage of filter elements. As a result, cyclonic plenum assembly 22 is able to reliably reduce or eliminate clogging of gas flow distributor 20 with minimal serving requirements, while also performing the traditional function of a gas chamber.

To optimize the cyclonic separation or cleaning function provided by cyclonic plenum assembly 22, the flow rate of the partially-reacted gas supplied to cyclonic separation chamber 76 is ideally maintained within a predetermined range. In many cases, the partially-reacted gas flow rate of the partially-reacted gas supplied to cyclonic separation chamber 76 will generally remain within a desired range during normal operation of the series-coupled fluidized bed reactor unit. However, in embodiments wherein the flow rate of the partially-reacted gas flow may fluctuate more drastically, the series-coupled fluidized bed reactor unit may be further equipped with a gas flow regulation system suitable for regulating the rate of gas flow provided to cyclonic plenum assembly 22. In this regard, and referring once again to FIG. 1, multi-stage fluidized bed hydrofluorination reactor unit 10 may be provided within a partially-reacted gas flow regulation system 130 disposed along flow line 62 between secondary hydrofluorinator 14 and primary hydrofluorinator 12. As shown in FIG. 1, flow regulation system 130 may include: (i) a flow rate sensor 132 fluidly coupled between partially-reacted gas outlet 56 of secondary hydrofluorinator 14 and partially-reacted gas inlet 34 of primary hydrofluorinator 12, (ii) a flow control valve 134 fluidly coupled between the partially-reacted gas outlet and partially-reacted gas inlet 34 and positioned downstream of flow rate sensor 132; and (iii) a controller 136 having an input and an output operatively coupled to flow rate sensor 132 and to flow control valve 134, respectively. During operation of reactor unit 10, controller 136 may modulate flow control valve 134 based at least partially on data received from flow rate sensor 132 to maintain the flow rate of the partially-reacted gas supplied to cyclonic plenum assembly 22, and specifically to cyclonic separation chamber 76 through gas/solids inlet pipe 72 (FIGS. 2 and 3), within a predetermined range over which cyclonic plenum assembly 22 is most effective at removing larger particles from the partially-reacted gas flow.

The foregoing has thus provided embodiments of a series-coupled fluidized bed reactor unit, such as a multi-stage fluidized bed hydrofluorination unit, including a cyclonic plenum assembly that removes particulate matter from a partially-reacted gas flow prior to entry into a gas distributor to minimize or eliminate gas distributor clogging. Advantageously, the above-described cyclonic plenum assembly provides continual and uninterrupted removal of larger entrained solids from the partially-reacted gas stream with minimal maintenance requirements. The foregoing has also provided embodiments of a hydrofluorination process carried-out utilizing such a series-coupled fluidized bed reactor unit and, specifically, a multi-stage fluidized bed hydrofluorination unit. In one embodiment, the hydrofluorination process includes the steps of: (i) directing a partially-reacted gas stream withdrawn from a secondary fluidized bed hydrofluorination into a cyclonic plenum assembly through a gas/solids inlet pipe tangentially disposed with respect to an annular sidewall of the cyclonic plenum assembly to induce vortex flow within the cyclonic plenum assembly and promote the cyclonic separation of entrained solids from the partially-reacted gas stream, and (ii) removing entrained solids separated from the partially-reacted gas stream through a solids drain pipe included within the cyclonic plenum assembly.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:
1. A series-coupled fluidized bed reactor unit, comprising:
a secondary fluidized bed reactor having a partially-reacted gas outlet;
a primary fluidized bed reactor, comprising:
a reaction vessel;
a gas distributor fluidly coupled to the reaction vessel; and
a cyclonic plenum assembly, comprising:
a plenum assembly housing fluidly coupled to the gas distributor and having an annular sidewall; and a gas/solids inlet pipe fluidly coupling the partially-reacted gas outlet to the plenum assembly housing, the gas/solids inlet pipe tangentially positioned with respect to the annular sidewall of the plenum assembly housing to induce vortex flow within the plenum assembly housing of the partially-reacted gas received from the secondary fluidized bed reactor through the gas/solids inlet pipe to promote the cyclonic separation of entrained solids from the partially-reacted gas prior to entry into the gas distributor.

2. A series-coupled fluidized bed reactor unit according to claim 1 wherein the gas/solids inlet pipe extends in a direction substantially parallel to and resides substantially adjacent a tangent line drawn to the annular sidewall of the plenum assembly housing.

3. A series-coupled fluidized bed reactor unit according to claim 1 wherein the cyclonic plenum assembly further comprises:
 a cyclonic separation chamber within the plenum assembly housing and into which the gas/solids inlet pipe feeds; and
 a clean gas chamber within the plenum assembly housing and fluidly coupled between the cyclonic separation chamber and the gas distributor.

4. A series-coupled fluidized bed reactor unit according to claim 3 wherein the cyclonic plenum assembly further comprises a partitioning member disposed within the plenum assembly housing between the cyclonic separation chamber and the clean gas chamber.

5. A series-coupled fluidized bed reactor unit according to claim 4 wherein the partitioning member has a central opening therein fluidly coupling the cyclonic separation chamber to the clean gas chamber.

6. A series-coupled fluidized bed reactor unit according to claim 5 wherein the partitioning member comprises a conical plate mounted within the plenum assembly housing.

7. A series-coupled fluidized bed reactor unit according to claim 6 wherein the outer diameter of the conical plate increases with increasing proximity to the gas distributor.

8. A series-coupled fluidized bed reactor unit according to claim 6 wherein the partitioning member further comprises a clean gas inlet pipe fluidly coupled to the central opening and extending from the conical plate in a generally downward direction.

9. A series-coupled fluidized bed reactor unit according to claim 8 wherein the clean gas inlet pipe extends from the conical plate beyond a horizontal plane drawn through the gas/solids inlet pipe.

10. A series-coupled fluidized bed reactor unit according to claim 8 wherein the cyclonic plenum assembly further comprises a solids drain pipe fluidly coupled to a lower portion of the plenum assembly housing.

11. A series-coupled fluidized bed reactor unit according to claim 10 wherein the solids drain pipe is substantially co-axial with the clean gas inlet pipe.

12. A series-coupled fluidized bed reactor unit according to claim 4 wherein the plenum assembly housing comprises:
 an upper housing member cooperating with the partitioning member and the gas distributor to define, in substantial part, the clean gas chamber; and
 a lower housing member fixedly coupled to the upper housing member and cooperating with the partitioning member to define, in substantial part, the cyclonic separation chamber.

13. A series-coupled fluidized bed reactor unit according to claim 12 wherein the upper housing member comprises a first circumferential flange, wherein the lower housing member comprises a second circumferential flange, and wherein the partitioning member comprises a third circumferential flange affixed between the first circumferential flange and the second circumferential flange.

14. A series-coupled fluidized bed reactor unit according to claim 1 further comprising a partially-reacted gas flow regulation system fluidly coupled between the partially-reacted gas outlet and the gas/solids inlet pipe, the partially-reacted gas flow regulation system maintaining the flow rate of the partially-reacted gas supplied to the gas/solids inlet pipe within a predetermined range during operation of the series-coupled fluidized bed reactor unit.

15. A series-coupled fluidized bed reactor unit according to claim 14 wherein the partially-reacted gas flow regulation system comprises:
 a flow rate sensor fluidly coupled between the partially-reacted gas outlet and the gas/solids inlet pipe;
 a flow control valve fluidly coupled between the partially-reacted gas outlet and the gas/solids inlet pipe, the flow control valve downstream of the flow rate sensor; and
 a controller having an input and an output operatively coupled to the flow rate sensor and to the flow control valve, respectively, the controller configured to modulate the flow control valve based at least partially on data received from the flow rate sensor to maintain the flow rate of the partially-reacted gas supplied to the gas/solids inlet pipe within a predetermined range during operation of the series-coupled fluidized bed reactor unit.

16. A series-coupled fluidized bed reactor unit according to claim 1 further comprising:
 a source of uranium dioxide; and
 a source of hydrogen fluoride gas;
 wherein the primary fluidized bed reactor comprises a solids inlet coupled to the source of uranium dioxide and a partially-reacted solids outlet for discharging partially-reacted solids; and
 wherein the secondary fluidized bed reactor comprises a gas inlet fluidly coupled to the source of hydrogen fluoride and a partially-reacted solids inlet coupled to the partially-reacted solids outlet for receiving partially-reacted solids from the primary fluidized bed reactor.

17. A fluidized bed hydrofluorination reactor unit for contacting a uranium dioxide feed with hydrogen fluoride gas to produce uranium tetrafluoride, the fluidized bed hydrofluorination reactor unit comprising:
 a primary fluidized bed hydrofluorination reactor, comprising:
  a reaction vessel having a solids inlet for receiving the uranium dioxide feed and having a partially-reacted solids outlet for discharging partially-reacted uranium tetrafluoride;
  a cyclonic plenum assembly having a partially-reacted gas inlet for receiving partially-reacted hydrogen fluoride gas; and
  a gas distributor fluidly coupling the cyclonic plenum assembly to the reaction vessel; and
 a secondary fluidized bed hydrofluorination reactor having a partially-reacted solids inlet coupled to the partially-reacted solids outlet for receiving the partially-reacted uranium tetrafluoride from the primary fluidized bed hydrofluorination reactor, a gas inlet for receiving the hydrogen fluoride gas, and a partially-reacted gas outlet fluidly coupled to the partially-reacted gas inlet for supplying partially-reacted hydrogen fluoride gas to the primary fluidized bed hydrofluorination reactor.

18. A fluidized bed hydrofluorination reactor unit according to claim 17 wherein the cyclonic plenum assembly comprises:
   a plenum assembly housing having an annular sidewall through which the partially-reacted gas inlet is provided; and
   a gas/solids inlet pipe fluidly coupling the partially-reacted gas outlet to the partially-reacted gas inlet, the gas/solids inlet pipe tangentially positioned with respect to the annular sidewall of the plenum assembly housing to induce vortex flow within the plenum assembly housing of the partially-reacted hydrogen fluoride gas received from the secondary fluidized bed reactor through the partially-reacted gas inlet to promote the cyclonic separation of entrained solids from the partially-reacted hydrogen fluoride gas prior to entry into the gas distributor.

19. A fluidized bed hydrofluorination reactor unit according to claim 17 wherein the gas/solids inlet pipe extends in a direction substantially parallel to and resides substantially adjacent a tangent line drawn to an inner circumferential surface annular sidewall of the plenum assembly housing.

20. A hydrofluorination process carried-out utilizing a fluidized bed hydrofluorination reactor unit including a primary fluidized bed hydrofluorination reactor fluidly interconnected with a secondary fluidized bed hydrofluorination reactor, the primary fluidized bed hydrofluorination reactor including a cyclonic plenum assembly, the process comprising:
   directing a partially-reacted gas stream withdrawn from the secondary fluidized bed hydrofluorination into the cyclonic plenum assembly through a gas/solids inlet pipe tangentially disposed with respect to an annular sidewall of the cyclonic plenum assembly to induce vortex flow within the cyclonic plenum assembly and promote the cyclonic separation of entrained solids from the partially-reacted gas stream; and
   removing the entrained solids separated from the partially-reacted gas stream through a solids drain pipe included within the cyclonic plenum assembly.

* * * * *